(12) United States Patent
Enochs et al.

(10) Patent No.: US 6,379,012 B1
(45) Date of Patent: Apr. 30, 2002

(54) OVERHEAD PROJECTOR MOUNT SYSTEM

(75) Inventors: Steven E. Enochs, New Palestine; Robert D. Wilson, Greensburg, both of IN (US)

(73) Assignee: Draper, Inc., Spiceland, IN (US)

( * ) Notice: Subject to any disclaimer, the term of this patent is extended or adjusted under 35 U.S.C. 154(b) by 0 days.

(21) Appl. No.: 09/597,049

(22) Filed: Jun. 20, 2000

(51) Int. Cl.[7] .................. G03B 21/14; G03B 21/22; G03B 21/00; G03B 21/28; H04N 5/64
(52) U.S. Cl. .................. 353/79; 353/37; 353/70; 353/71; 353/73; 353/77; 353/94; 353/99; 353/119; 353/122; 353/64; 348/744; 348/789; 348/794; 348/836
(58) Field of Search .................. 353/37, 70–74, 353/77–79, 94, 98–99, 119, 122, 63–66, DIG. 3, DIG. 4; 348/739, 744, 789, 794, 836–839

(56) References Cited

U.S. PATENT DOCUMENTS

| | | | |
|---|---|---|---|
| 3,488,115 A | 1/1970 | Nemec et al. | 353/99 |
| 3,544,208 A | 12/1970 | Wasson | 353/22 |
| 3,578,857 A | 5/1971 | Busch | 353/94 |
| 3,645,531 A | 2/1972 | Wright | 463/17 |
| 3,807,847 A | 4/1974 | Okana | 353/71 |
| 3,882,269 A | 5/1975 | Niehaus | 725/93 |
| 4,003,644 A | 1/1977 | Aruanno | 352/72 |
| 4,114,291 A | 9/1978 | Taub | 434/261 |
| 4,160,999 A | 7/1979 | Claggett | 348/151 |
| 4,215,373 A | 7/1980 | Goldenberg et al. | 348/781 |
| 4,243,307 A | 1/1981 | Rizzuto | 353/57 |
| 4,348,187 A | 9/1982 | Dotsko | 434/44 |
| 4,639,106 A * | 1/1987 | Gradin | 353/13 |
| 4,750,832 A | 6/1988 | Lloyd, Sr. et al. | 352/243 |
| 5,123,728 A * | 6/1992 | Gradin et al. | 353/78 |
| 5,379,080 A | 1/1995 | Onozuka | 353/37 |
| 5,386,257 A | 1/1995 | Swartwood | 352/198 |
| 5,408,283 A | 4/1995 | Lee | 353/77 |
| 5,584,554 A | 12/1996 | Moore et al. | 353/122 |
| 5,622,417 A | 4/1997 | Conner et al. | 353/69 |
| 5,669,688 A * | 9/1997 | Baar et al. | 353/119 |
| 5,676,442 A | 10/1997 | Fujimore | 353/119 |
| 5,836,664 A | 11/1998 | Conner et al. | 353/70 |
| 5,911,490 A * | 6/1999 | Ishikawa et al. | 353/99 |
| 5,947,577 A * | 9/1999 | Jikihara et al. | 353/97 |
| 5,993,011 A | 11/1999 | Smock et al. | 353/119 |

OTHER PUBLICATIONS

"Audio Visual & Video Projection Screens and Related Equipment Dealer Net Price List AV299–Effective Feb. 15, 1999", Draper, Inc., date unknown.

* cited by examiner

Primary Examiner—Russell Adams
Assistant Examiner—Magda Cruz
(74) Attorney, Agent, or Firm—Bose McKinney & Evans LLP

(57) ABSTRACT

An overhead projector mounting system is provided that is configured to support a projector in a ceiling of a room. The system includes a housing having an opening through which an image generated by the projector is transmitted. Preferably, the system includes a mirror to reflect the image generated by the projector toward a viewing surface in the room.

22 Claims, 12 Drawing Sheets

OVERHEAD PROJECTOR MOUNT SYSTEM

FIELD OF THE INVENTION

The present invention relates to video projection systems, and, in particular, to a system used to mount a video projector overhead.

BACKGROUND OF THE INVENTION

Video projectors of the type that cast a viewable image onto the front surface of a screen are utilized in a wide variety of venues, such as conference rooms and classrooms. The mounting or installation of such video projectors has taken many forms in the past. In some situations, it has been found highly desirable for the video projector to be stored in a room so as to be as inconspicuous as possible to avoid detracting from the aesthetics of the room. As a result, several video projector mounting systems have been developed to store the video projector overhead and above the ceiling of the room in which it is utilized.

One above ceiling system disclosed previously by Draper, Inc., of Spiceland, Ind., included a housing designed to be suspended from a support structure above a ceiling of a room. A video projector, which was supported on the floor of the housing, cast an image on a first mirror fixedly mounted within the housing, which fixed mirror reflected the cast image through openings in the housing floor and ceiling onto a second mirror that was installed on the upwardly facing surface of a trap door which opened doom into the room at an angle when the projector was to be used. The image cast upon the second mirror when the trap door was opened then reflected back onto a screen in the room for viewing. When the projector was not being used, the trap door was closed so as to cover the opening in the ceiling and to be flush with the ceiling.

While highly desirable in that the video projector was stored out of site, and further that the video projection system, and specifically only the trap door with a mirror, did not extend into the room significantly even during its use, such system was not without its shortcomings. For one thing, the system was not compatible with many types of projectors due to the operating characteristics, such as the light path, of those projectors. For example, when certain projectors were properly situated on the housing so as to cast an image directly on the first mirror, all of the image reflected by the first mirror did not fall on the trap door mirror, and consequently what was reflected onto the screen to be visible was incomplete. Moreover, even when used with projectors for which all of the image reflected by the first mirror did fall on the trap door mirror, the system sometimes resulted in visible images being cast on a location which was unacceptable or undesirable, such as at a height on the projection screen which was higher or lower than desired. And, since moving the projector relative to the first mirror was not a suitable adjustment technique for some projectors, which for optimal operation need to be spaced a particular distance from the first mirror, consistent adjustment of the image location was not readily possible.

A second shortcoming pertained to the imprecise positioning of the pivotable trap door on which the second mirror was installed. Failure to properly orient or angle the second mirror relative to the first mirror results in the image cast on the in-room screen being improperly located along the height of that screen. In an attempt to address this issue, two electrical limit switches were installed in the system. The limit switches were circuited to a reversible motor that rotated a shaft. Linkages attached to the shaft were connected to the trap door to open and close that door when the shaft was rotated in opposite directions. First and second switch actuating arms were connected to the shaft at different points along the shaft length. One of the actuating arms was arranged to rotate and trigger one of the limit switches when the trap door was being opened, and the other actuating arm was arranged to rotate and trigger the other limit switch when the trap door was being closed. While the limit switches when triggered functioned to shut off power to the door-moving motor, the orientation at which the trap door actually stopped depended on how far the shaft rotated under its own inertia after the motor power was removed and was not consistent. Consequently, the trap door was not always tightly shut after being closed. More problematic was the fact that when opened, the trap door and therefore the second mirror were not always angled properly relative to the ceiling for use, resulting in the quality of the viewing experience being lessened due to the projected image not being properly located on the screen.

In another overhead projector mounting system, a shortcoming relates to the limited accessibility to the housed components when installed. While a housing is useful to provide a protective enclosure for the system components, such as the projector and the control hardware, and to possibly serve as a plenum for conveying fan-circulated air, the housing hinders access. For example, since the housing is installed in the space above the room ceiling where frequently little clearance space is present, removing the top of the housing to access the housing interior to service the system components is inconvenient.

Thus, it would be desirable to overcome these and other shortcomings of the prior art.

SUMMARY OF THE INVENTION

The present invention provides a mounting system for an overhead projector which allows for adjustment in the height at which an image is projected on a viewable surface within a room. The system is equipped with a mirror above the ceiling that reflects an image received from the projector onto a mirror on a trap door that extends down into the room. The above ceiling mirror, and preferably the projector as well, is mounted on a carriage which is movable within the system housing and relative to the trap door mirror to adjust where an image is reflected onto the trap door mirror, which adjustment alters where the image reflected by the trap door mirror falls upon a viewing surface. To aid in proper positioning of the mirrored trap door when that door is moved between opened and closed positions, the system preferably includes a door stop control mechanism having both a limit switch, which cuts off power to a door moving motor, and a stop which provides a physical block to further door motion. The system also preferably includes a housing with a sliding cover to facilitate access to the projector and other components within the housing.

In one form thereof, the present invention provides an overhead projector mount system for a room including a support mountable at or above a ceiling of the room, at least one carriage above the ceiling and movable relative to the support, a first mirror mounted to a first carriage of the at least one carriage to be movable with that first carriage, and a second mirror. The first mirror is aligned to receive images projected by a projector mounted to either the support or the at least one carriage and to reflect the images downward through an opening in the ceiling. The second mirror extends below the ceiling of the room to receive images reflected by the first mirror and reflect the images to a viewing surface in the room. Movement of the first carriage between first and second positions adjusts a location on the second mirror at which images are received from the first mirror.

In another form thereof, the present invention provides an overhead projector mount system for a room including a support for a projector mountable at or above a ceiling of the room, a mirror movable between a first orientation and a second orientation, and a drive assembly including a motor. The mirror when in the second orientation extends below the ceiling of the room to receive images generated by the projector which pass through an opening in the ceiling and reflect the images to a viewing surface in the room. The drive assembly is operable to move the mirror between the first and second orientations. The system includes a limit switch, which is circuited with the motor and actuatable by the drive assembly to stop the motor when the mirror moves from the first orientation to the second orientation, and a stop member, which is abuttable by the drive assembly to positively stop the mirror at the second orientation when the mirror moves from the first orientation to the second orientation. The limit switch and stop member are provided on a common mounting member adjustably movable relative to the drive assembly, whereby movement of the common mounting member relative to the drive assembly moves both the limit switch and the stop member to adjust the second orientation of the second mirror.

In still another form thereof, the present invention provides a housing for an overhead projector including a base for supporting the projector, and a cover for the base. The base is disposed at or above a ceiling of a room and includes an opening for passage of projected images into the room. The cover includes first and second pieces, wherein the first piece is slidable relative to the second piece and the base between closed and opened positions. Movement of the first piece from the closed position to the opened position creates an opening in the cover for accessing the projector.

One advantage of the present invention is that an overhead projector mount system is provided which allows the location where an image is cast upon a screen to be adjusted simply and quickly.

Another advantage of the present invention is that an overhead projector mount system is provided which allows a first overhead mirror on which an image is projected to be moved to adjust a location of the cast image.

Another advantage of the present invention is that an overhead projector mount system is provided which can maintain a projector and a first mirror in a constant, spaced relationship during adjustments of a location of the cast image.

Another advantage of the present invention is that an overhead projector mount system is provided which accommodates a wide variety of shapes and sizes of projectors, including a wider variety of projector types than at least one prior art design.

Another advantage of the present invention is that a stop for a pivotable mirrored door of an overhead projector mount system is provided which allows significant, precise adjustability of the mirrored door.

Another advantage of the present invention is that a housing is provided for an overhead projector mount system that includes a slidable portion to allow ready access to the projector and other components within the housing for service and maintenance.

Still another advantage of the present invention is that a housing for an overhead projector mount system is provided into which is integrated supports for ceiling tiles, such that the transition between the room ceiling and the system is aesthetically pleasing.

DESCRIPTION OF THE FIGURES

The above mentioned and other advantages and objects of this invention, and the manner of attaining them, will become more apparent and the invention itself will be better understood by reference to the following descriptions of embodiments of the invention taken in conjunction with the accompanying drawings, wherein.

Figure 1:
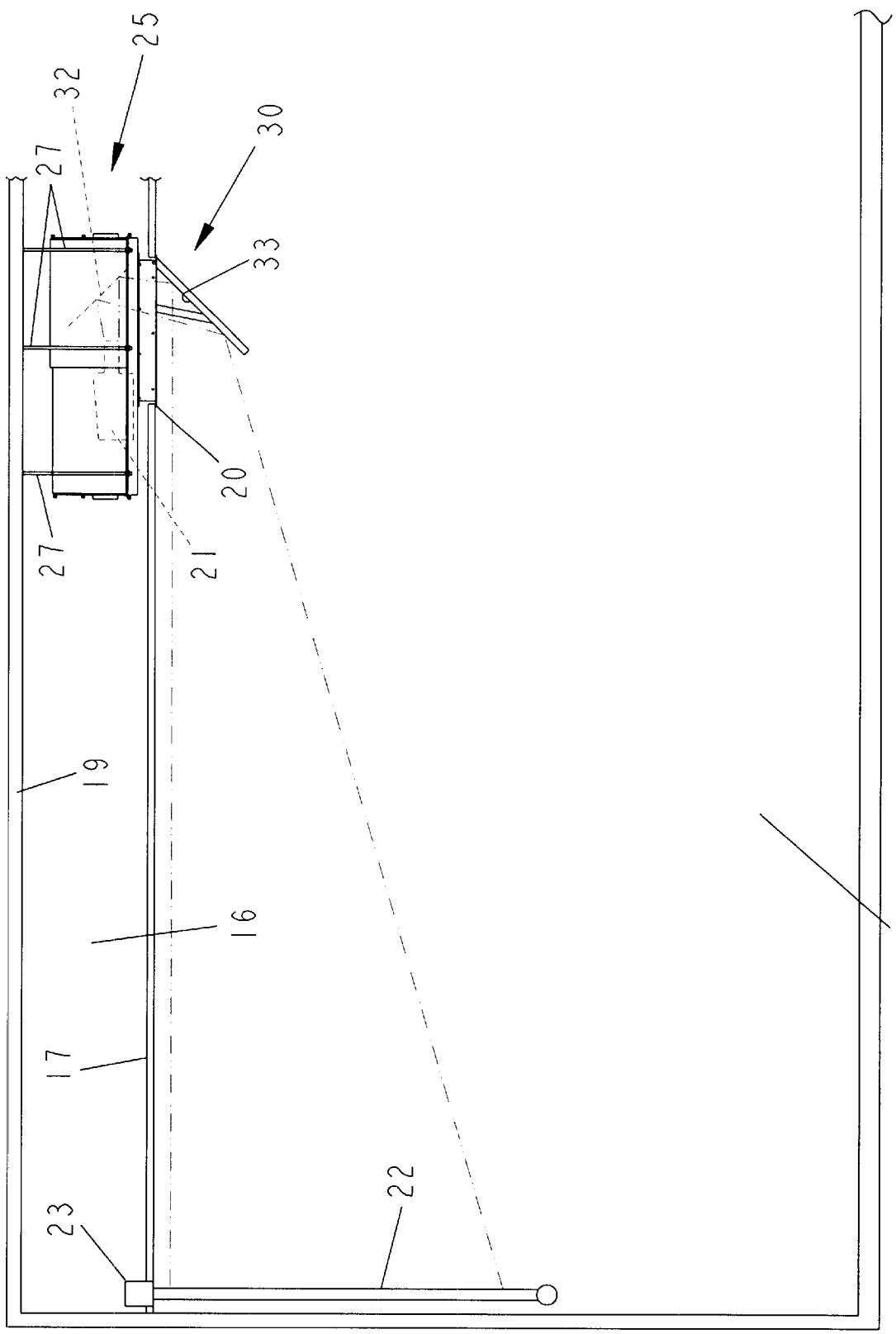
FIG. 1 is a diagrammatic side view of an overhead projector mount system of the present invention installed in a conference room according to an exemplary form of the present invention, wherein the mirrored trap door is shown in an operable orientation or alignment extending into the room.

Corresponding reference characters indicate corresponding parts throughout the several views. Although the drawings represent an embodiment of the invention, the drawings are not necessarily to scale and certain features may be exaggerated or omitted in order to better illustrate and explain the present invention.

DESCRIPTION OF THE PREFERRED EMBODIMENTS

The embodiments disclosed below are not intended to be exhaustive or limit the invention to the precise forms disclosed in the following detailed description. Rather, the embodiments are chosen and described so that others skilled in the art may better utilize the teachings of the invention.

FIG. 1 shows a room, such as a conference room 15, in which an exemplary form of an overhead projector mount system, generally designated 25, is installed for use. Projector mount system 25 is installed in the space 16 above the ceiling 17 of room 15, such as a suspended ceiling mounted in a conventional and not shown manner. Six vertically extending rods 27 attach at their upper ends to a ceiling support structure 19 of the building and at their lower ends with a series of nuts to the installation flanges on both sides of the housing base panel described below. Projector mount system 25 is installed over a rectangular opening 20 provided in ceiling 17, and includes a trap door with frame assembly, generally designated 30, that completely covers ceiling opening 20 when the trap door is moved from its open orientation shown in FIG. 1 to a closed or storage orientation.

Room 15 includes a viewing surface on which are projected video images generated by the overhead projector mounted within projector mount system 25. As abstractly shown in dashed lines, a projector 21 casts an image onto a first mirror 32, which received image is reflected down to a second mirror 33 provided as an upper surface of the trap door, and second mirror 33 reflects the received image back onto viewing surface 22. When installing the inventive system, due to the fact that to optimize image quality the projector 21 is positioned as close as possible to first mirror 32, which achieves as small a reflected image as possible on the mirrors, the size of the image on surface 22 is controlled by installing system 25 at a suitable horizontal distance from surface 22. In the shown embodiment, the viewing surface is a front projection screen 22 situated at the end wall of the room and which hangs below the ceiling 17. Screen 22 is shown as a motorized screen retractable when not in use within a housing 23 installed above the ceiling 17. Other types of viewing surfaces may alternatively be employed, such as pull down screens or by screen surfaces integrated into the wall of room 15.

With additional reference to FIGS. 2–6, projector mount system 25 in the preferred form includes a main pan 38 that functions as a bottom wall portion of the housing as well as the base or frame to which the other components of the video projector mount system are mounted either directly or indirectly. Additional covering portions of the housing are not shown in these figures to allow the main pan to be more fully visible. Other shaped frames or structures, such as interconnected beams, on which the system is assembled may be used instead of main pan 38.

Main pan 38 is formed from sheet aluminum with a rectangular base panel 39 having upturned flanges 40 and 41 at its front and back edges, and upturned, horizontal-lipped flanges 43 and 44 at its side edges. Openings 45 formed in flange 41 accommodate not shown wiring, possibly including power and control cables, that operationally extend between the components housed in system 25 and, for example, the room, such as in the case of cables to a room wall-mounted control box when hard-wired technology is employed instead of the remote control technology which is also within the scope of the invention. Three spaced holes 46 in flange 40, and three holes 47 in flange 41, are used in the assembly of the housing. The center hole 46 and the center hole 47 each receive in a press fit an internally threaded insert used to receive screws that attach the housing end panels to main pan 38. Four holes 48 in flange 40 and four holes 49 in flange 41 receive in a press fit internally threaded inserts for securing fan assemblies to main pan 38. With respect to the above holes that use the press fit internally threaded inserts, such inserts are used rather than providing tapped holes. However, internally threaded insert lined holes and tapped holes may be interchanged as appropriate by a skilled artisan for use with these as well as the other screw attachments in the system, and therefore such are not always distinguished further herein.

Three holes 50 spaced along the length of the lip of each of installation flanges 43 and 44 accommodate rods 27 with associated nuts to directly mount or hang main pan 38 from ceiling support structure 19. In alternate embodiments, the main pan and the remainder of the projector mount system may be mounted above the ceiling in other suitable manners. For example, the main pan may be supported on beams slung underneath the housing base and which are themselves connected to the ceiling support structure or, if desired, to the walls which form the room.

In the preferred embodiment, projector 21 is positionable on an inner pan or carriage element, generally designated 55, to which a first mirror 32 is mounted and that is movable relative to main pan 38 for adjustment of the center line of the image displayed on screen 22. Inner pan 55 is formed in the shown embodiment from an aluminum sheet with a rectangular rearward section 57 and a smaller width rectangular forward section 59. Pan section 59 is narrower to fit between the linkages used to pivot the trap door between open and closed arrangements. Rearward section 57, on which is freely set and thereby mounted the video projector during the installation process, includes upwardly extending side flanges 60 and 61 that increase the inner pan rigidity. Forward section 59 includes upwardly extending side flanges 63 and 64, and an end flange 66. A rectangular opening 68 in forward section 59 is aligned over a larger rectangular opening 52, shown in dashed lines in FIG. 3, through base panel 39 of main pan 38.

A rigid mirror support panel 70 is securely attached with fasteners. such as screws, to pan side flanges 63 and 64, and when attached is horizontally movable with inner pan 55. Extra mounting holes for the fasteners are preferably provided in flanges 63 and 64 to allow support panel 70 to be mounted at a lower height along the flanges than shown, such as about one inch lower, but with the same angle relative to horizontal, for use with some types of projectors.

Figure 2:
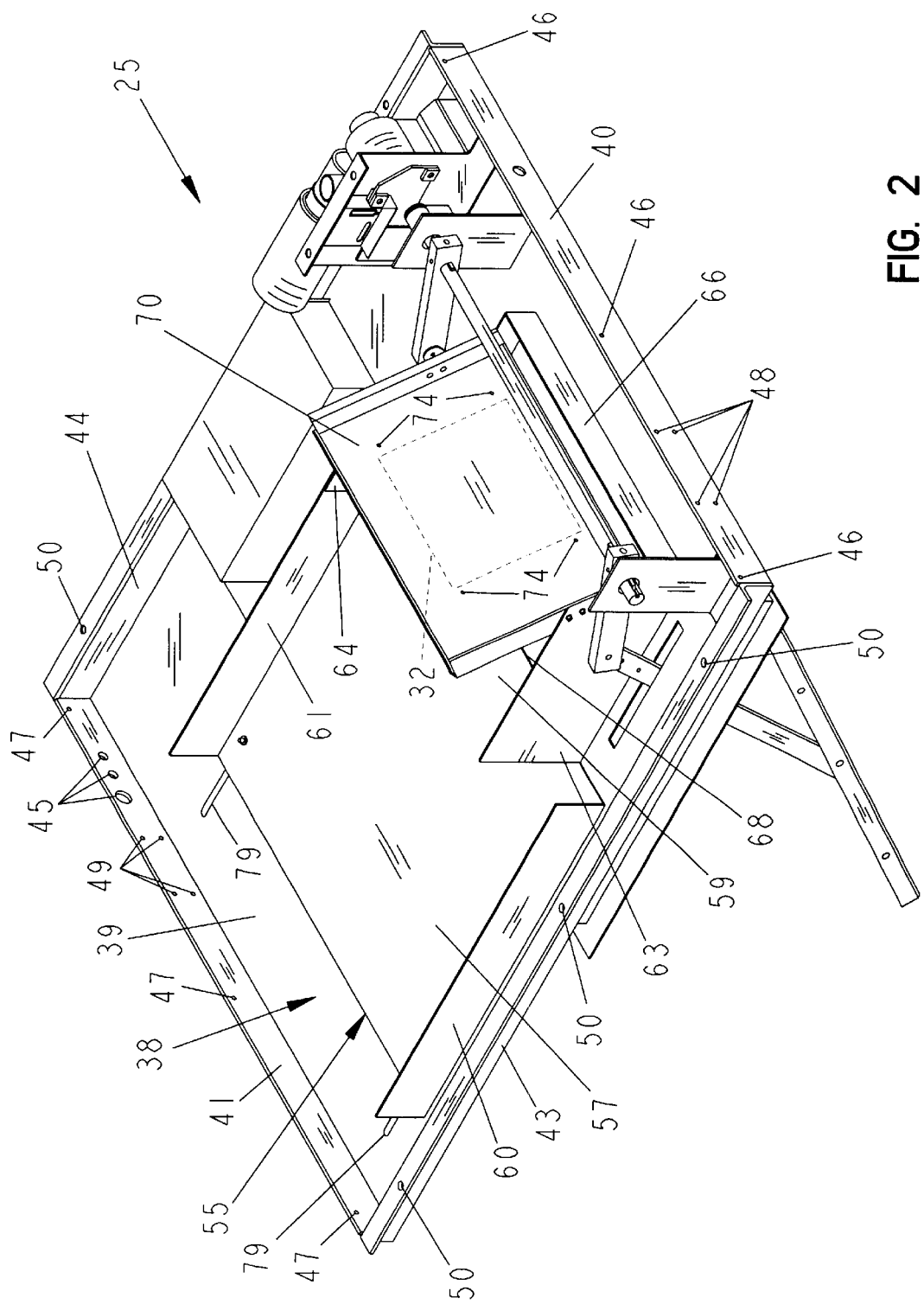
FIG. 2 is a front perspective view of the overhead projector mount system of FIG. 1. shown separate from the room and with portions including upper panels of the housing removed to reveal the interior of the system.

A first surface mirror, outlined in dashed lines at 32 in FIG. 2, is attached to the underside of the angled bottom surface of support panel 70 with z-shaped brackets secured to panel 70 with four fasteners shown at 74. Mirror 32 is disposed at a fixed angle relative to inner pan 55, and reflects an image cast by projector 21 downward and through inner pan opening 68 and main pan opening 52 to a second mirror described below. Mirror 32 is shown disposed at an angle relative to inner pan 55 of approximately forty-five degrees such that horizontal beams are reflected exactly vertically downward, although larger or smaller angles are within the scope of the invention.

During installation, an installer mounts projector 21 on rearward pan section 57 the proper distance from mirror 32, which distance may be a function of the type of projector and is finally determined by the installer experimentally. To aid in properly repositioning projector 21 on pan section 57 after the projector is handled at later times during maintenance, such as to replace a projector bulb, alignment guides may be placed on pan section 57 after the initial projector installation to show where the projector is to be mounted to inner pan 55. One suitable but not shown optional type of guide is a series of L-shaped brackets arranged to flank each of the four sides of the projector. The lower bracket legs attach to pan section 57, and the upstanding bracket legs flank but are not attached to the projector. In one form, the base legs of the brackets aligned along the front and sides of the projector are attachable to pan section 57 with adhesive, while the base legs of the brackets aligned along the rear of the projector are attachable to pan section 57 via mating hook and loop fasteners, which hook and loop fasteners allow ready bracket removal such that the projector can be slid out rather than lifted out from between the alignment guides for maintenance.

Inner pan 55 is movable along a track relative to main pan 38 such that the position of first mirror 32 and the projector mounted to pan 55 may be adjusted during installation along a predetermined, preferably linear, path. The term track is used generally herein to refer to any configuration that achieves a particular path of motion of inner pan 55. In the preferred embodiment, the track includes a pair of parallel slots 79 formed in base panel 39 which extend beneath the lateral, back regions of rearward section 57 of inner pan 55. For each slot, a follower extending into the slot from the inner pan and that slides along the slot length is provided.

Figure 3:
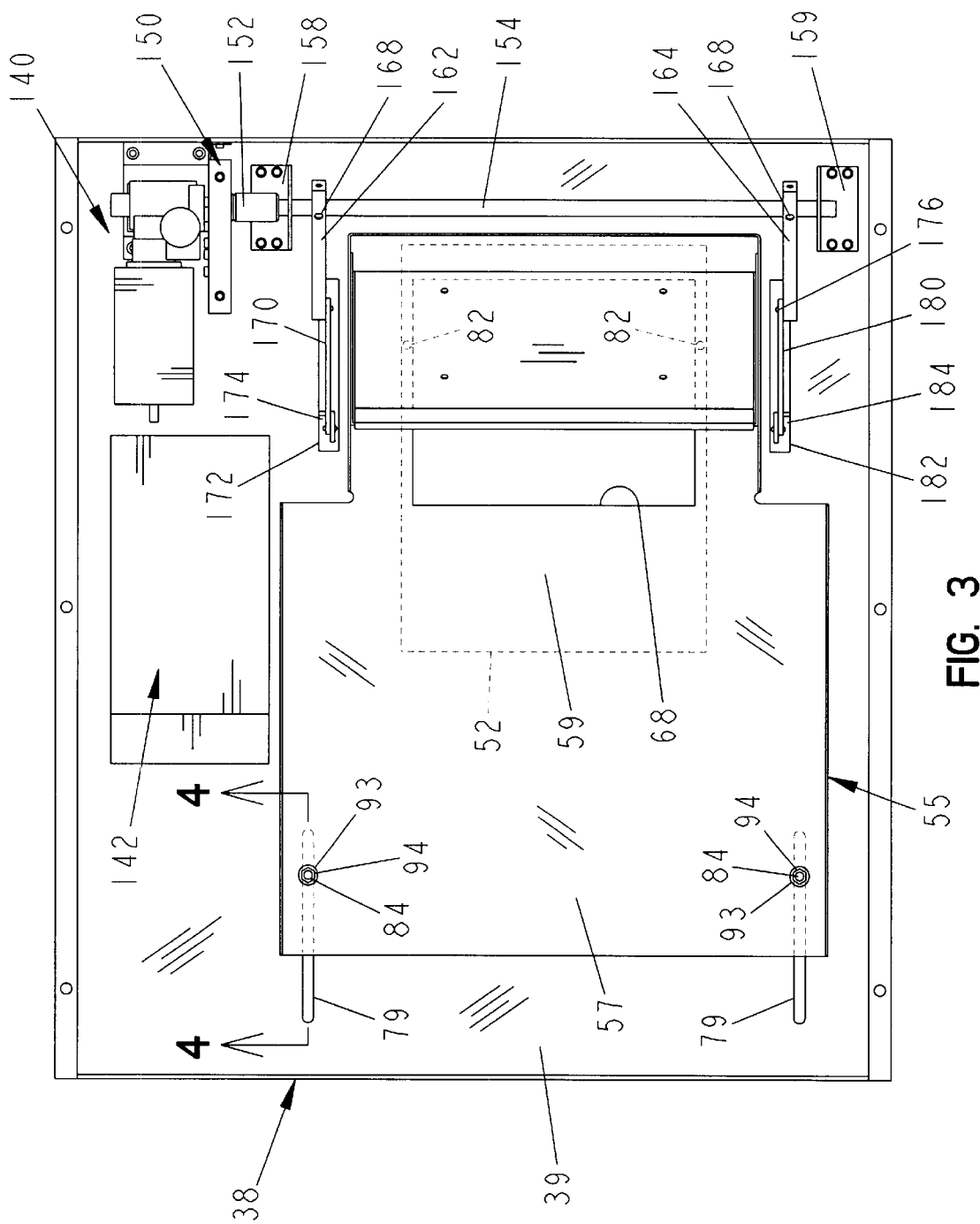
FIG. 3 is a top view of the overhead projector mount system of FIG. 2.

The track in the preferred form is further achieved by first and second guide members, abstractly shown at 82 in FIG. 3, that project below the underside of inner pan forward section 59 and extend into opening 52. Guide members 82 are positioned in close proximity to the edges of base panel 39 which define opening 52, and abutting contact of the guide members with the edges aids in keeping motion of inner pan 55 relative to main pan 38 along a linear path during inner pan adjustment. Suitable materials for guide members 82 include internally threaded inserts that press fit from below into holes in inner pan 55 and that receive screws inserted through inner pan 55 from above, as well as fastener mounted bushings and downwardly extending tabs formed from the inner pan.

Figure 4:
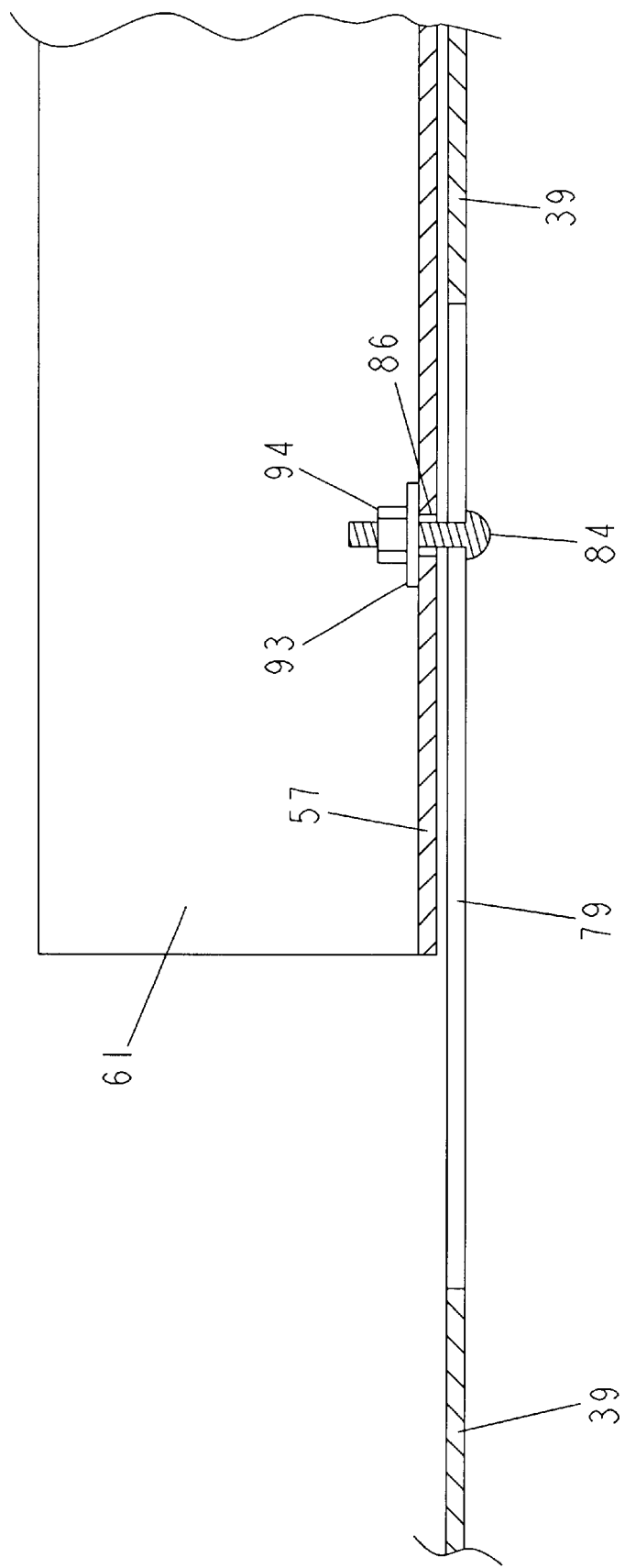
FIG. 4 is a fragmentary cross-sectional view, taken along line 4—4 of FIG. 3.

A follower preferred for use with each of track slots 79, and which also serves as a preferred pan locking mechanism, uses a carriage bolt as shown in the cross-sectional view of FIG. 4. The shank of carriage bolt 84 extends upward through slot 79, and through an opening 86 in inner pan rearward section 57. The slots are only slightly wider than the diameter of the bolt shank such that lateral play of the inner pan along the track is minimal. The head of bolt 84 is sized larger than the width of slot 79 so as to not pass through. Washer 93 and lock nut 94 are provided on the threaded bolt end. When lock nut 94 is in a loosened state, if the frictional forces between inner pan 55 and main pan 38 are overcome by an installer pulling or pushing pan 55, inner pan 55 is movable along the main pan length. When a suitable inner pan position is achieved at which the projector 21 and first mirror 32 are properly positioned relative to the trap door mounted second mirror such that the image reflected by first mirror 32 is properly positioned on second mirror 33, tightening down lock nut 94 with washer 93 on the bolt in each of slots 79 tightens inner pan 55 against main pan 38 to prevent further inner pan movement.

Other track designs may be used within the scope of the present invention to provide the inner pan guiding feature. For example, the slots and followers could be reversed on the pan members, or a single slot with multiple followers spaced along the slot length to limit pan rotation may be employed. Alternatively, either the guide members, or the slots with followers, could be eliminated altogether if necessary. Still further, and by way of example, the track may be provided in the form of upstanding ridges in the main pan which flank the side edges of the inner pan, or engage grooves in the underside of the main pan, so as to prevent lateral movement of the inner pan during end-to-end movement. Rather than the sliding contact between the pans, wheels or ball-bearing slides may be introduced to reduce the friction of movement between the main pan and the inner pan. Locking devices such as self-tapping screws that connect the inner and outer pans when adjustment in the field is complete may also be used in place of the shown lockable followers. Still other suitable locking devices include, but are not limited to, cam-locks, spring-loaded pins that extend through the inner pan and fit within holes or indents in the main pan, and adhesives.

Although in the preferred embodiment shown in the Figures both projector 21 and first mirror 32 are supported on a single carriage element, other carriage designs are within the scope of the present invention. For example, to still allow for adjustment of where an image is reflected onto trap door mirror 33, first mirror 32 may be provided on a carriage element which moves along a track relative to the main pan 38 independently from the projector, and which carriage element can be locked to the main pan when a proper mirror positioning is established. When not mounted on the same carriage element on which is mounted first mirror 32, the projector will preferably be mounted to a separate, lockable carriage element movable relative to the main pan 38 along its own track which is parallel to the track of the first mirror carriage element, but the projector also could be mounted directly to the main pan 38. In still other embodiments where the image height adjustment achieved by moving the first mirror is not desired, the inner pan or carriage element may be eliminated.

Figure 5:
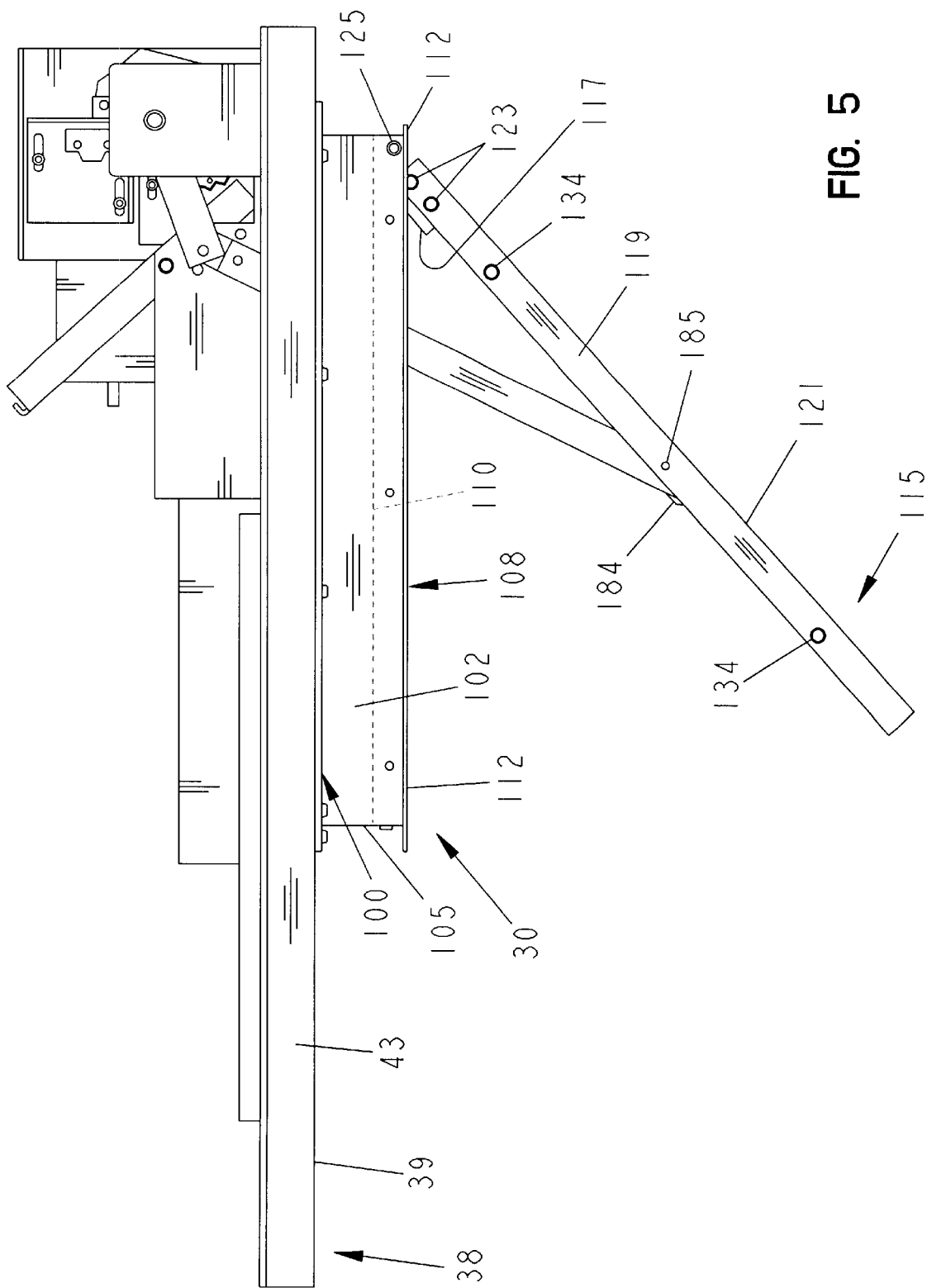
FIG. 5 is a side view of the overhead projector mount system of FIG. 2.
Figure 6:
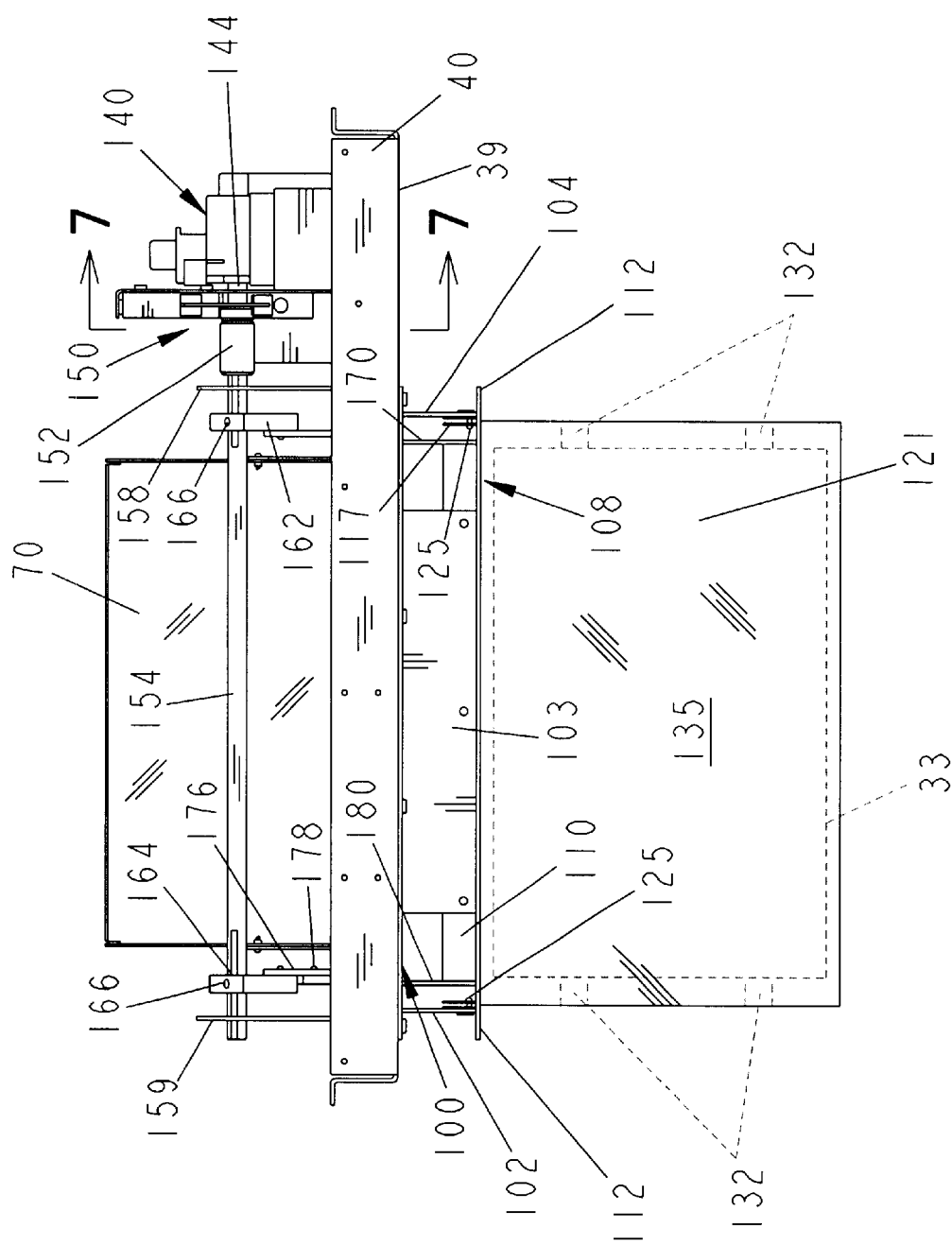
FIG. 6 is a front end view of the overhead projector mount system of FIG. 2.

With primary reference to FIGS. 5 and 6, the trap door with frame assembly 30, which is installed with its bottom face generally flush with ceiling 17, depends from the underside of main pan 38, and therefore main pan 38 is installed above ceiling 17. In an alternate embodiment within the scope of the invention, main pan 38 can be designed to be installed at or flush with the ceiling and with the trap door pivotable about a point above base panel 39, but such is typically less preferred from an aesthetics standpoint.

Trap door with frame assembly 30 of system 25 includes a mounting strip 100 arranged in a rectangular configuration and that extends around base panel opening 52 and is secured with fasteners, such as screws, to the underside of main pan base panel 39. Mounting strip 100 is integrally formed with four depending, rectangular frame members 102–105, each of which flanks one of the four sides of rectangular opening 52. A trim strip 108, which is arranged in a rectangular configuration and made of aluminum with a room-facing appearance that matches the appearance of brackets conventionally used to suspend ceiling tiles, includes four upwardly extending flanges, each referenced at 110, that are fastened to frame members 102–105. A horizontally projecting lip portion 112 of trim strip 108 extends around the entire periphery of frame assembly 30 to serve as a ledge on which the room ceiling, such as ceiling tiles, may be supported.

Trap door 115 of frame assembly 30 is hingedly mounted to allow pivoting between an operational alignment, at which it extends at an angle into room 15, and an inactive alignment flush with lip portion 112 of trim strip 108 and therefore ceiling 17. The shown hinged attachment employs a rigid hinge plate 117 at either side of the door. Each upturned side flange 119 of metal door panel 121 is connected to a hinge plate 117 with flat head screws 123, and a shoulder bolt 125 inserts through the opposite end of each hinge plate 117 and connects to one of frame member 102 and 104.

A second mirror 33 is attached to the upper surface of door panel 121 with four brackets 132 connected to door side flanges 119 with flat head screws 134. Second mirror 33 is a first surface mirror that reflects backward, or to the left to a FIG. 5 observer, images that are received as a reflection from first mirror 32 during use. The lower surface 135 of door panel 121 is typically of a white color which blends in with the appearance of ceiling 17, but door panel 121 may be designed to incorporate ceiling tiles of other ceiling materials as its lower surface so as to more closely match certain ceilings.

Moving means are provided for pivoting the trap door with second mirror 33 between its open and closed orientations. In the preferred embodiment shown, the moving means includes a reversible electric motor 140 securely mounted to main pan base panel 39. The components that control the operation of the overhead system, including motor 140, are housed within an electrical chassis 142 securely mounted to base panel 39. The wiring, such as power wires, leading from chassis 142 either to outside of the system housing through holes 45 or to other system components, such as motor 140, may be provided in any conventional manner and are not shown for purposes of illustration.

With primary reference to FIG. 6, output shaft 144 of motor 140 extends horizontally through a door stop control mechanism, generally designated 150. Shaft coupler 152 uses internal keys that fit within axial slots provided on end portions of output shaft 144 and linkage shaft 154 to connect shafts 144 and 154 in a rotationally fixed manner so as to rotate together. Linkage shaft 154 is journaled along its opposite end portions to a pair of brackets 158 and 159 which are fixedly mounted to main pan base panel 39. Bronze bushings and their retaining shaft collars that are radially disposed between shaft 154 and brackets 158 and 159 to facilitate shaft rotation are not shown.

A preferred articulated linkage spanning linkage shaft 154 and mirrored trap door 115 includes a pair of radially extending fixed links 162 and 164 that rotate with shaft 154. Each of fixed links 162 and 164 is made of a rigid, steel bar and threadedly receives a set screw 166 in its end that presses a not shown key into an axial slot provided in shaft 154 to lock links 162 and 164 to linkage shaft 154 in a rotationally fixed manner. As best shown in FIG. 3, an additional set screw 168 within a tapped bore in each of links 162 and 164 can be tightened directly against shaft 154 to further lock links 162 and 164 to shaft 154.

At its distal end, fixed link 162 is pivotally connected to an upper end of a link 170 made from a steel bar. Link 170 extends through rectangular opening 172 in base panel 39 and at its lower end is pivotally connected to one upright leg of a U-shaped bracket 174, the other upright leg of which is fastened to upturned side flange 119 of metal door panel 121. At its distal end, fixed link 164 is pivotally connected to an upper end of a slotted adjustment bar 176. Two screws indicated at 178 extend through separate, aligned slots in bar 176 and fasten to the upper end of a link 180 made from a steel bar. Link 180 extends through rectangular opening 182 in base panel 39 and at its lower end is pivotally connected to one upright of a U-shaped bracket 184, the other upright of which is fastened at 185 to door side flange 119. During installation, by loosening screws 178, then moving link 180 relative to bar 176 to cause the screws to move within the provided slots, and then tightening screws 178 to secure link 180 to adjustment bar 176, the effective linkage length between fixed link 164 and the trap door can be adjusted in the field to account for any door warpage. Although the above-described motor driven assembly is preferred, other motor driven assemblies which achieve a lowering and raising of the trap door, may be employed within the scope of the present invention. For example. the assembly may include a series of motor-windable belts or cables which suspend the pivotable trap door, or a gear or drive screw connection between the pivotable trap door and motor, or possibly hydraulic or pneumatic controlled components. In another alternate embodiment in which the trap door moves linearly, as opposed to rotationally, between opened and closed positions, the assembly may comprise a rack and pinion mechanism configured to cause the trap door to translate downward at a constant angle relative to horizontal from a storage position within the housing and adjacent the first mirror to an operational position within the room and beneath the first mirror.

Figure 7:
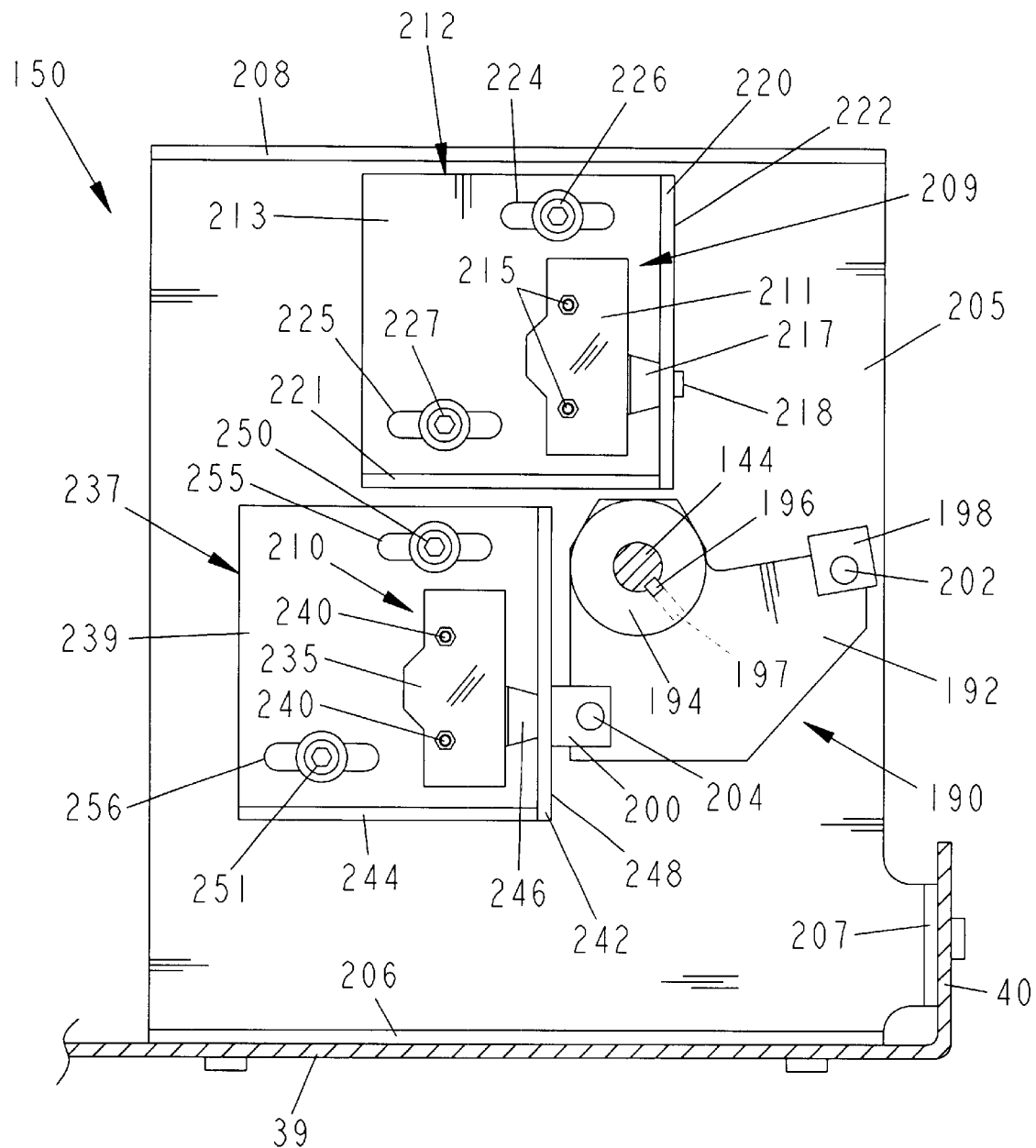
FIG. 7 is a fragmentary cross-sectional view, taken along line 7—7 of FIG. 6, of the door stop control mechanism mounted to the housing.

To cause mirror 33 on trap door 115 to be precisely aligned whenever moved to its open or closed orientations, stop means are preferably provided that function to both cut off power to motor 140 as well as physically stop trap door motion. In other embodiments where this precise control is not always desired, this type of stop means may be modified or eliminated. A preferred form of stop means is the door stop control mechanism 150 shown in FIG. 7, which includes a lever assembly 190 that is keyed to motor output shaft 144 so as to rotate together. In FIG. 7, lever assembly 190 is shown at an angular orientation around shaft 144 which corresponds to the trap door 115 having been closed by motor operation. Lever assembly 190 comprises a zinc plated steel plate 192 to which hub 194 is fixedly attached, such as by welding. Motor shaft 144 extends through aligned holes in plate 192 and hub 194. Key 196 is pressed into an axial slot provided in shaft 144 by set screw 197 that is tightened down within a radially extending, tapped bore in hub 194 to lock together lever assembly 190 and shaft 144. A not shown second set screw fits within a tapped bore in hub 194 and is tightened directly against shaft 144 to further rotationally lock lever assembly 190 to shaft 144.

U-shaped striker blocks 198 and 200 made of zinc plated steel sheet fit over edges of plate 192 and provide a wider surface area on which to dissipate stopping forces. Abstractly shown clevis pins 202 and 204, or other suitable fasteners, extend through holes in the plate-flanking legs of each of blocks 198 and 200 and plate 192 to mount blocks 198, 200 to plate 192.

Positioned between motor 140 and lever assembly 190 is a limit switch panel 205 having a not shown hole through which extends motor shaft 144. Mounting flanges 206 and 207 that tranversely extend from panel 205 are secured with screws to base panel 39 and upturned flange 40 to mount panel 205 to the system housing. Other manners of mounting panel 205 may be employed, and panel 205 could be mounted to other elements of the system, such as motor 140, within the scope of the invention. A guard plate that is fastenable to top flange 208 and which covers the components mounted to panel 205 to prevent inadvertent contact with movable parts during service is not shown in the Figures to facilitate illustration.

Installed on limit switch panel 205 are first and second limit switch assemblies, generally designated 209 and 210, that are structured and arranged to cooperate with lever assembly 190 to shut off power to motor 140 when mirrored trap door 115 has been pivoted to selected orientations. Limit switch assembly 209, which is electrically circuited with controls within chassis 142, cuts off power to motor 140 when triggered as trap door 115 moves from its closed alignment to its open alignment. Limit switch assembly 209 includes a base 211 mounted to a plate section 213 of metal bracket 212 with fasteners indicated at 215. Stop flange 220, and a base flange 221 provided to increase bracket rigidity, are integrally formed with and transversely extend from bracket plate section 213. A fixed collar portion 217 of a trigger clement of assembly 209 is connected to base 211, and a trigger element plunger 218 axially movable within collar portion 217 extends through a hole in stop flange 220 of bracket 212. Stop flange 220 serves as an abutment which is contacted by and serves to stop striker block 198 when lever assembly 190 is moved from the angular orientation shown in FIG. 7 to the angular orientation shown in FIG. 2. The tip of plunger 218 of the trigger element projects slightly beyond the forward face 222 of stop flange 220 such that the plunger 218 moves to cause the motor power to be cut off at least when, and preferably slightly before, striker block 198 is rotated into motion-halting contact with stop flange 220. When power cut off is at the preferred time of slightly before the abutting contact of striker block 198 with flange 220, the motion of lever assembly 190 which brings striker block 198 into contact with flange 220 is a result of the inertia of the motor shaft and the parts connected thereto, and as a result the motor is not running when the shaft rotation is physically stopped so to prevent motor damage.

The positioning of bracket 212 on supporting panel 205 is adjustable to allow precise adjustments as to where lever assembly 190 and shaft 144, and therefore second mirror 33 on trap door 115, is stopped during the process of opening the trap door for use. In the preferred form, bracket plate section 213 includes a pair of parallel, horizontally aligned slots 224 and 225. Socket head cap screws 226 and 227 with washers extend through slots 224 and 225 and into threaded engagement with internally threaded inserts press fit within holes in panel 205. When screws 226 and 227 are loosened, an installer may slide bracket 212 linearly along panel 205 such that screws 226, 227 slide within slots 224, 225 to a point at which both trigger element plunger 218 and stop flange 220 are positioned such that during trap door opening, motion of mirror 33 will be stopped when it is at an optimal angle with respect to ceiling 17 so that the image displayed on screen 22 is optimized. When the stop flange 220 and trigger element plunger 218 are satisfactorily positioned, screws 226 and 227 are tightened to lock bracket 212 to panel 205 to achieve desired trap door angling in future operations. This sliding bracket design allows fine adjustments to be readily made, and further allows for a simultaneous movement, both in a temporal sense and a spatial sense, of the limit switch trigger and the positive stop. Other mountings which allow adjustment to the position of bracket 212 may be employed within the scope of the present invention. For example, the slots may be non-linear or provided on the panel instead of the bracket, differently designed tracks such as one employing a single slot with guides may be used, and different ways of locking the bracket to a support may be used.

Limit switch assembly 210 is similarly designed to assembly 209, but is configured to cut off power to motor 140 as trap door 115 moves to its closed alignment from an opened, operational orientation. Limit switch assembly base 235 is mounted to a plate section 239 of bracket 237 with fasteners 240. Bracket 237 includes stop flange 242 and base flange 244. Trigger element collar 246 connected to base 235 retains a plunger that extends through a hole in stop flange 242, which serves as an abutment that is contacted by and serves to stop striker block 200 when lever assembly 190 is moved from another position to the angular orientation shown in FIG. 7. The not shown tip of the plunger retained in trigger element collar 246 projects slightly beyond the forward face 248 of stop flange 242 when not being forced backward by its actuating engagement by striker block 200 shown in FIG. 7, and is designed to achieve a motor power cut off preferably slightly before striker block 200, due to inertia after power cut-off, contacts stop flange 242, or at least upon block 200 contact with flange 242, to halt further rotation of lever assembly 190.

Bracket 237 is adjustably positioned on supporting panel 205 such that the closed position of trap door 115 can be adjusted. Socket head cap screws 250 and 251 with washers extend through slots 255 and 256 in bracket plate section 239 and into threaded engagement with internally threaded inserts press fit within holes in panel 205, and screws 250 and 251 allow bracket adjustment in a similar manner as described above to cause the plunger tip associated with collar 246 and stop flange 242 to be positioned such that trap door 115 will be stopped when properly closed, preferably flush with the ceiling.

In the preferred embodiment of FIG. 7, the limit switches and positive stops are shown as engaging an actuating member which is rotatable with the motor shaft used to power the lowering and raising of the second mirror. Such a configuration is merely illustrative, however, as the limit switches and the stops could be differently positioned within the scope of the invention. For example, such could be mounted so as to engage other portions of one or more of the components used to move the trap door, such as fixed link 162, and alternatively, more likely with respect to the upward extent or closed position of trap door 115, could engage the second mirror 33 or trap door 115. Still further, while the adjustability of bracket 212 is highly desirable to ensure that second mirror 33 is properly located in its operational position such that the image will be reflected onto the optimal location of a viewable surface, the need for precise closure of trap door 115, while important for aesthetics, is less important from an operational sense, and therefore bracket 237 need not be as readily adjustable.

Figure 8:
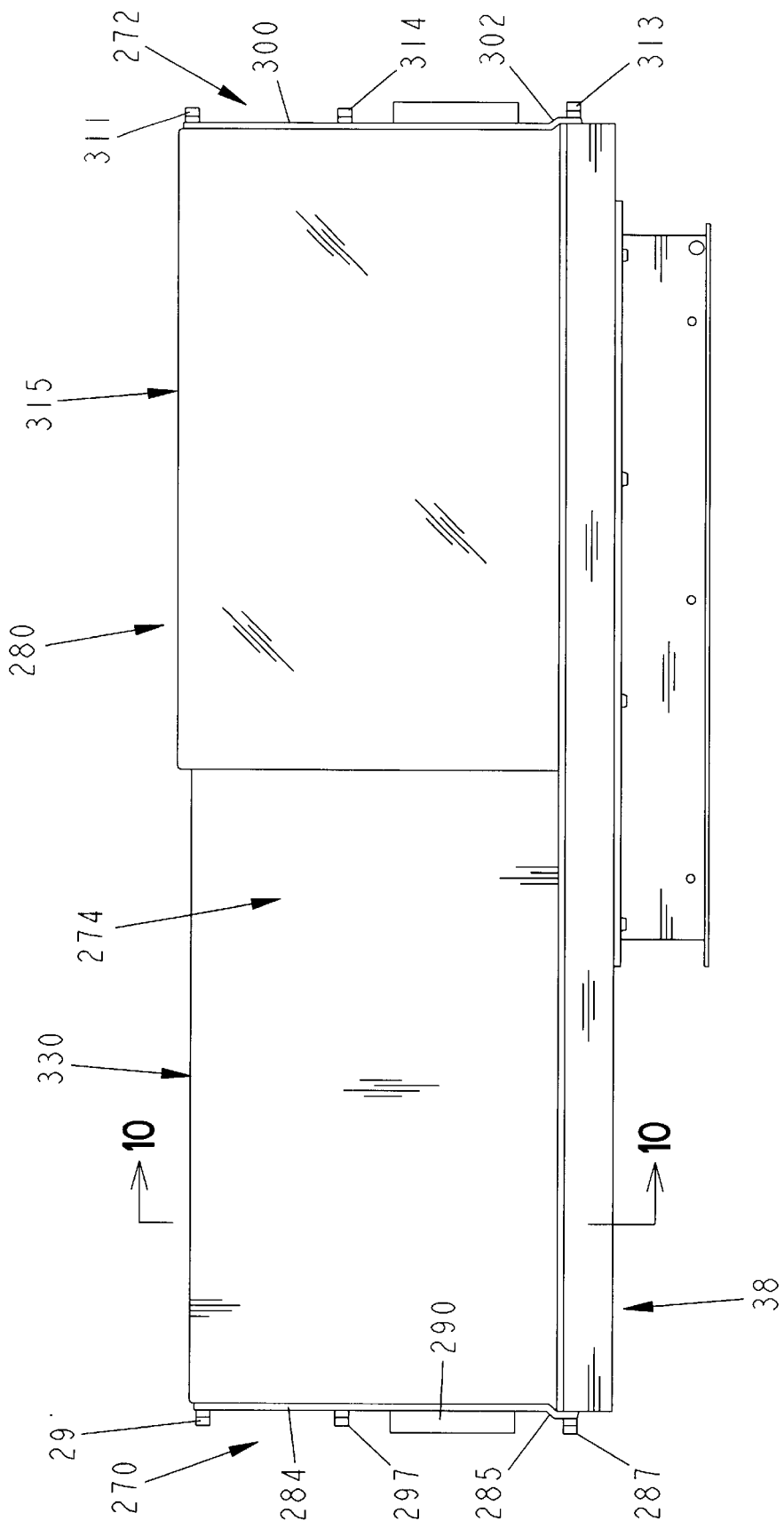
FIG. 8 is a side view of the overhead projector mount system of FIG. 1, shown separate from the room and with the trap door with mirror located in its closed position.
Figure 9:
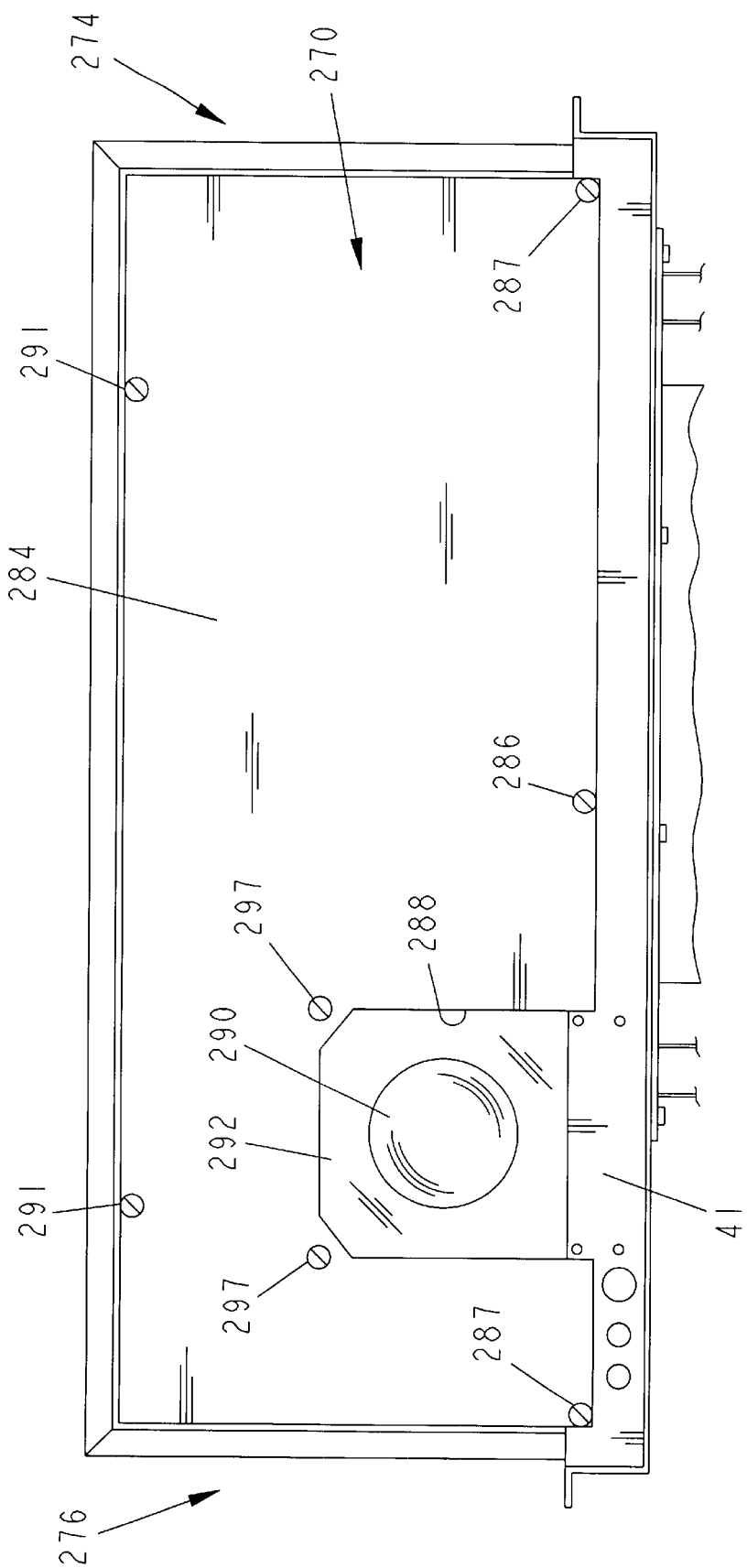
FIG. 9 is a fragmentary left or rear end view of FIG. 8.

Referring now to FIGS. 8–12, the preferred housing of projector mount system 25 that encloses the system components within its interior is further illustrated in various views. The housing encloses the projector and other components in that the housing periphery blocks off ready manual access to the interior, but the enclosure need not be without any openings or otherwise air-tight. Supported on its bottom wall portion or housing main pan 38, the housing further includes opposite end walls 270 and 272, side walls 274 and 276, and a top wall 280, that altogether form a generally parallelepiped structure. As best shown in FIG. 9, end wall 270 includes an upstanding rectangular panel 284 made of aluminum. Panel 284 includes a flared portion 285 at its lower end that fits over flange 41 such that the upper portion of panel 284 is generally coplanar with flange 41. Panel 284 is directly mounted to pan flange 41 by a fastener 286 that screws into an internally threaded insert press fit within flange hole 47. To facilitate assembly and disassembly of the housing, a spring-loaded, captured screw which is retained on panel 284 when not being used is preferably used for fastener 286, as well as the other captured fasteners so described herein. Captured fasteners 287 freely fit through the holes 47 in the side portions of flange 41 to engage the housing sliding cover part as described below.

In the preferred embodiment, the housing that protects the system components also serves as a plenum for a cooling air flow over the components. To force air through the plenum, fans are preferably provided in the end walls. An opening 288 in panel 284 exposes an abstractly shown caged fan 290 installed on mounting plate 292 which opens both outward from and inward into the housing interior. Fan 290 is designed to draw air into the housing interior from outside the housing, such as through a not shown duct that ports into room 15. Along its lower edge portion, mounting plate 292 is secured to pan flange 41 by screws that insert into internally threaded inserts press fit within flange holes 49. A pair of captured fasteners 297 of panel 284 attach to the upper portion of mounting plate 292 to further mount panel 284 to flange 41 via plate 292.

Figure 10:
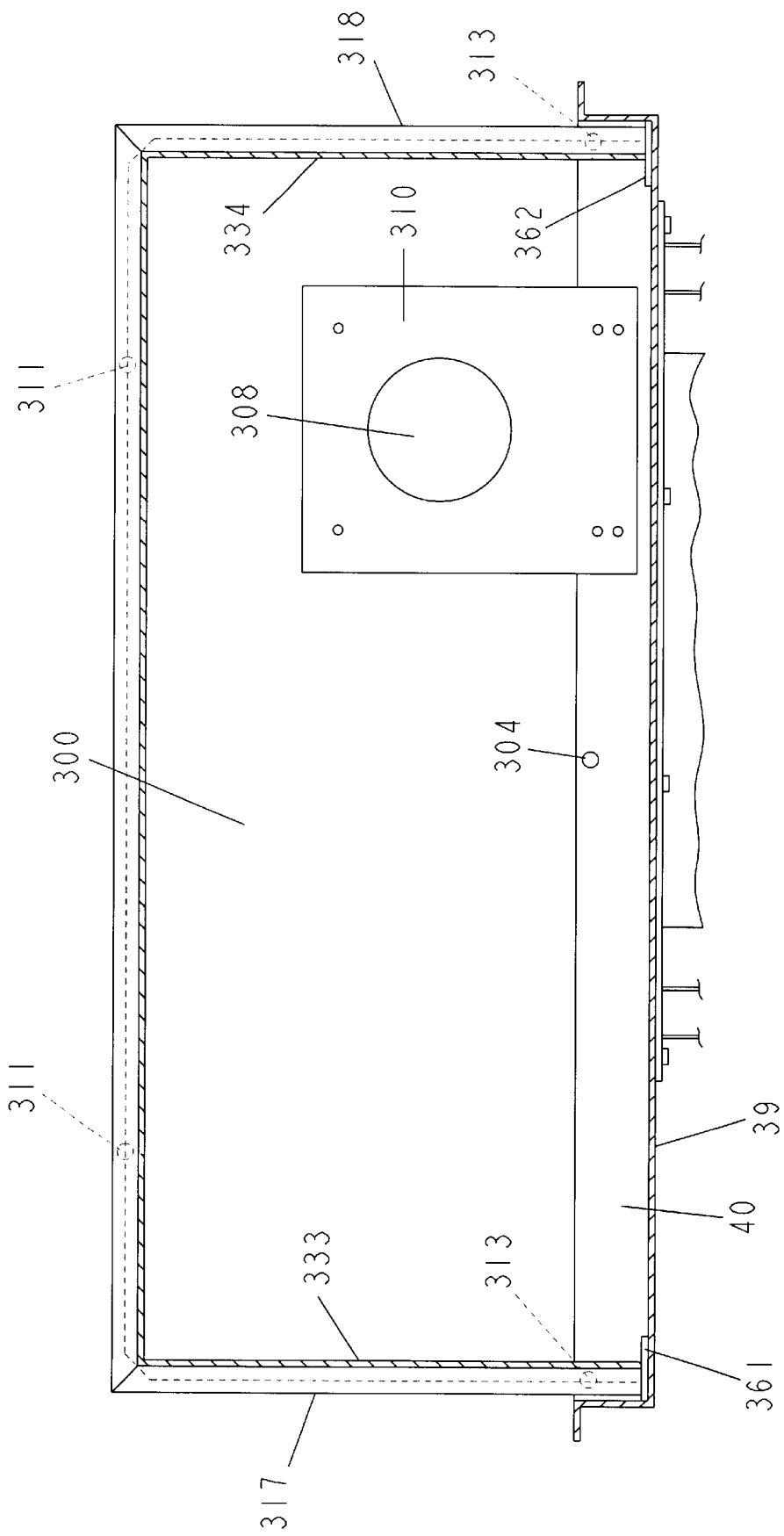
FIG. 10 is a fragmentary cross-sectional view, taken along line 10—10 of FIG. 8, of the system housing, wherein housed system components are not shown.

With primary reference to the cross-sectional view of FIG. 10, end wall 272 is similarly formed from aluminum panel 300 with flared bottom portion 302. Panel 300 is mounted to pan flange 40 by a captured fastener 304 that screws into an internally threaded insert press fit within the center hole 46 of flange 40. A caged fan 308, which is located in the opposite housing corner as fan 290 so as to create a longer air flow path, is installed on mounting plate 310, and fan 308 is externally exposed in end wall 272 by a not shown opening in panel 300. Fan 308 forces air out of the housing interior, and a not shown duct communicating with fan 308 can convey the exhausted air to a desired site, such as into room 15. Mounting plate 310 is secured to pan flange 40 by screws that insert into internally threaded inserts press fit within flange holes 48, and panel 300 attaches to mounting plate 310 via a pair of captured fasteners 314.

To facilitate access to components housed within the system housing without physically removing the entire housing cover, one or more portions of the housing cover are slidable relative to other portions to reveal the housing interior. In the preferred embodiment shown, the two slidable cover portions together comprise the top and the majority of the sides of the housing, thereby providing large access openings when moved. In other designs, less of the cover, such as a top portion, or a side portion, or a combination thereof, may be designed to slide between opened and closed positions.

Figure 11:
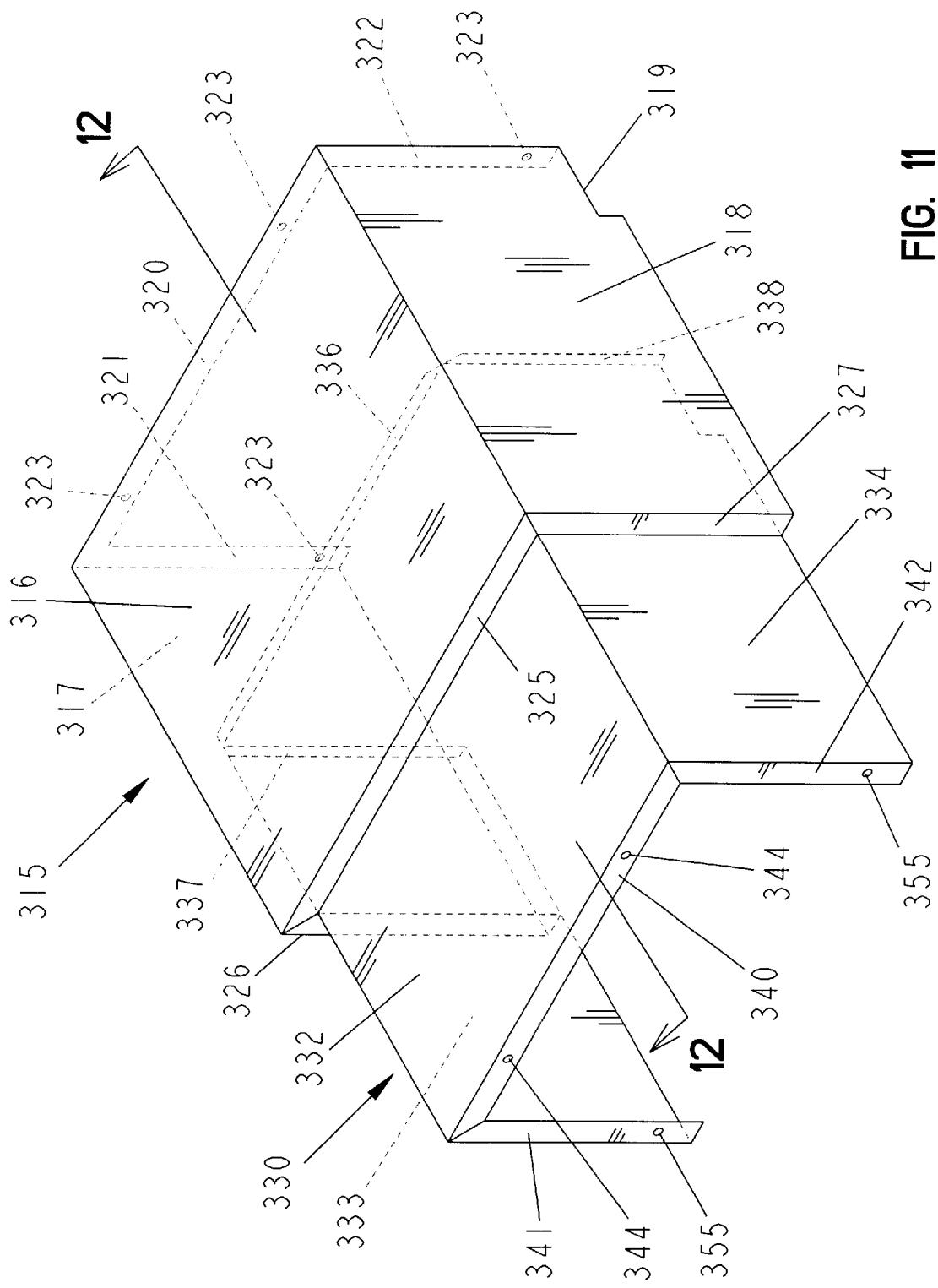
FIG. 11 is rear perspective view of the housing slidable parts shown removed from the rest of the system.
Figure 12:
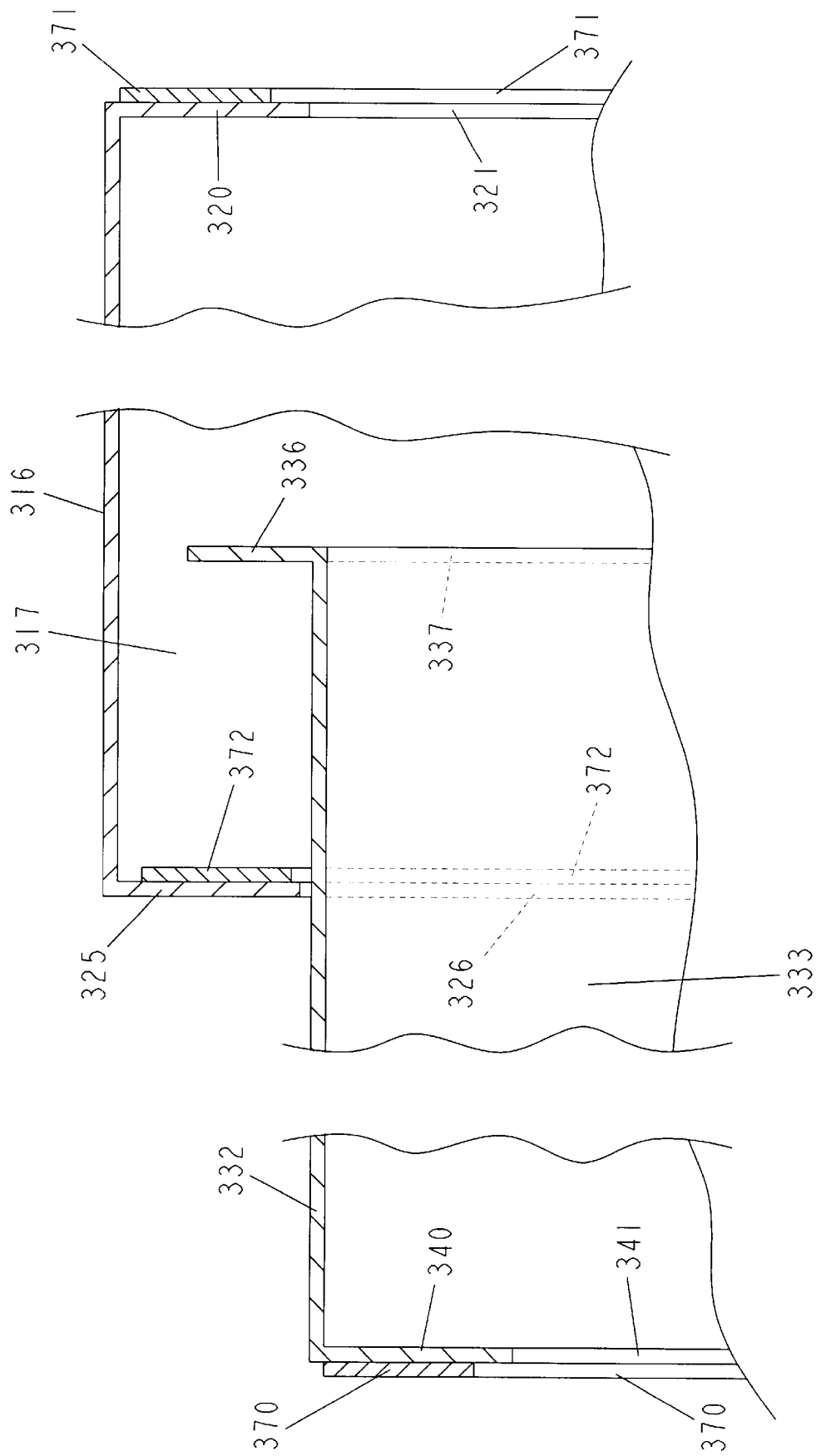
FIG. 12 is a fragmentary cross-sectional view, taken along line 12—12 of FIG. 11.

As best shown in FIG. 11, side walls 274 and 276 and top wall 280 are formed by an outer cover 315 and an inner cover 330 which are each slidable relative to the other and along the housing base to allow ready access to the housing interior at either end of the housing. Outer cover 315 is manufactured from a 1/16 inch thick aluminum sheet in an inverted square-U shape that provides a top panel section 316 from which depends side panel sections 317 and 318. At its forward end, side panel section 318 is notched at 319 to fit over bracket 159 that supports linkage shaft 154. At its forward edge, panel section 316 includes a downwardly or inwardly extending flange 320 along its entire width, and panel sections 317 and 318 similarly include inward flanges 321 and 322, respectively, that are mitered at their upper ends to match the mitered edges of flange 320 and which preferably extend all of the height of the panel sections at that edge. At its base, panel section 317 and its flange 321 are chamfered to fit the bend of pan flange 40 upward from main pan base panel 39. Flanges 320–322 together provide a narrow lip, such as about ¾ inch wide. Flange 320 includes a pair of internally threaded insert equipped holes 323, and flanges 321 and 322 each include a single such hole 323, that are engaged by captured fasteners 311 and 313, respectively, of end panel 300 to secure outer cover 315 to end wall 272. At its rearward edge, panel section 316 includes an inwardly extending flange 325, and panel sections 317 and 318 similarly include mitered, inward directly flanges 326 and 327, respectively. The narrow lip provided by flanges 325–327, such as about ½ inch wide, serves to limit air escape as described below.

Inner cover 330 is manufactured from an aluminum sheet in an inverted square-U shape with top panel section 332 from which depends side panel sections 333 and 334. The height and width of inner cover 330 is slightly smaller than the height and width of outer cover 315 such that inner cover 330 and outer cover 315 fit in a telescoping fashion when one is moved relative to the other in the direction of its length. To maximize access when opened, inner cover 330 and outer cover 315 have approximately the same length, thereby allowing the front half of the housing interior to be accessed when outer cover 315 is slid backward, and the back half of the housing interior to be accessed when inner cover 330 is slid forward. At its forward edge, panel section 332 includes an upwardly extending flange 336 along its entire width, and panel sections 333 and 334 along their heights similarly include flanges 337 and 338, respectively. Flanges 336–338, which when the housing is fully assembled for use are in close proximity with the lip formed by flanges 325–327, each project about ¼ inch and serve to limit air escape from the housing interior.

At its rearward edge, top panel section 332 includes along its entire width an inwardly extending flange 340, and panel sections 333 and 334 similarly include flanges 341 and 342, respectively, that are mitered at their upper ends to match the mitered edges of flange 340 and which extend substantially all of the height of the panel sections. At its base, panel section 333 and its flange 341, as well as panel section 334 and its flange 342, are each chamfered to fit the bend of pan flange 41 upward from main pan base panel 39. Flanges 340–342 together provide a narrow lip, such as about ¾ inch wide. Flange 340 includes a pair of internally threaded insert equipped holes 344, and flanges 341 and 342 each include a single such hole 355, that are engaged by captured fasteners 291 and 287, respectively, of panel 284 to secure inner cover 330 to rear end wall 270.

In the shown embodiment, when unfastened from the rear end wall and front end wall, respectively, to which it is preferably attached for use, each of inner cover 330 and outer cover 315 are slidable along main pan 38 between a closed position, such as shown in FIG. 8, and opened positions at which the housed contents may be accessed. When inner cover 330 is opened by being moved forward so as to telescope within or underneath outer cover 315, the bottom edges of side panel portions 333 and 334 slide along low-friction strips 361, 362 secured to the upper surface of main pan base panel 39 along its length. When outer cover 315 is opened by being moved rearward so as to telescope over or above inner cover 330, the bottom edges of side panel portions 317 and 318 slide along low-friction strips 361, 362. A suitable material for each of strips 361, 362 is a one-inch wide strip of an ultra high molecular weight polyethylene tape available from Auburn Plastics & Rubber, Inc. of Indianapolis, Ind. Although friction reducing devices need not be provided within the scope of the invention, such do make moving the cover portions easier, and may be provided in other forms.

When the system housing is to serve as a plenum, air sealing means are provided in the preferred embodiment between certain interconnected component parts of the plenum. In particular, a seal is provided between inner cover 330 and end panel 284, outer cover 315 and end panel 300, and inner cover 330 and outer cover 315. In a preferred form shown in the cross-sectional view of FIG. 12, a ¾ inch wide strip of ⅛ inch thick foam tape 370 is adhered to flanges 341, 340 and 342 and, when cover 330 is fastened to end panel 284, forms an air-tight seal between inner cover 330 and end panel 284. Tape 370 preferably extends continuously along the entire lengths of flanges 340–342 for the best sealing characteristics. Similarly, a ¾ inch wide strip of foam tape 371 continuously extends along the lengths of flanges 321, 320 and 322 to provide for an air-tight seal between outer cover 315 and end panel 300 when connected together. A 3/16 inch wide strip of foam tape 372 is adhered to the interior facing surface of each of flanges 325–327 along their entire lengths, which tape contacts flanges 336–338 when the inner and outer covers are attached to their respective end walls to form an air-tight seal between inner cover 330 and outer cover 315. The various foam tapes may naturally be attached to the other of the surfaces with which it is designed to seal.

While this invention has been shown and described as having multiple designs, the present invention may be further modified within the spirit and scope of this disclosure. For example, portions of the inventive system may find beneficial application in projection systems that do not use a mirror above the ceiling and in which the above ceiling projector therefore casts an image through the ceiling opening directly onto the trap door mirror for reflection onto the viewing surface. Moreover, the housing may be differently configured, such as in situations where a plenum function need not be provided. This application is therefore intended to cover any variations, uses, or adaptations of the invention using its general principles. Further, this application is intended to cover such departures from the present disclosure as come within known or customary practice in the art to which this invention pertains.

What is claimed is:

1. An overhead projector mount system for a room comprising:
    a support mountable at or above a ceiling of the room;
    at least one carriage above the ceiling and movable relative to said support, said at least one carriage comprising a first carriage movable relative to said support between first and second positions;
    a first mirror mounted to said first carriage to be movable with said first carriage, said first mirror aligned to receive images projected by a projector mounted to one of said support and said at least one carriage and to reflect the images downward through an opening in the ceiling;
    a second mirror that extends below the ceiling of the room to receive images reflected by said first mirror and reflect the images to a viewing surface in the room; and
    wherein movement of said first carriage between said first and second positions adjusts a location on said second mirror at which images are received from said first mirror.

2. The overhead projector mount system of claim 1 wherein said first carriage comprises a first portion to which said first mirror is mounted and a second portion for mounting the projector, whereby said first mirror mounted to said first portion is moved simultaneously with the projector mounted to said second portion when said first carriage is moved between said first and second positions.

3. The overhead projector mount system of claim 2 wherein said second mirror is movable between a first orientation and a second orientation, wherein said second mirror when in said second orientation extends below the ceiling of the room at an angle.

4. The overhead projector mount system of claim 3 wherein said second mirror is included on an upper surface of a trap door operably connected to said support to be pivotable between said first and second orientations, wherein said trap door is aligned flush with the ceiling when said second mirror is in said first orientation.

5. The overhead projector mount system of claim 2 wherein said first carriage is movable relative to said support along a track comprising at least one slot in one of said support and said first carriage, and at least one follower slidable within said at least one slot and connected to the other of said support and said first carriage.

6. The overhead projector mount system of claim 5 wherein said at least one slot comprises first and second parallel slots in said support, and said at least one follower comprises first and second followers that extend downward from said first carriage and through said first and second slots, respectively, in said support.

7. The overhead projector mount system of claim 2 further comprising means for locking said first carriage in a fixed position relative to said support.

8. The overhead projector mount system of claim 7 wherein said locking means comprises a bolt and nut attachment, wherein said bolt extends through a slot in said support.

9. The overhead projector mount system of claim 2 wherein said carriage second portion comprises a flat surface on top of which the projector is positioned, and wherein said carriage first portion projects forward from said second portion and defines an opening in registry with the opening in the ceiling and includes an upturned flange at each of its laterally outer edges to which said first mirror is fixedly mounted.

10. An overhead projector mount system for a room comprising:
    a support for a projector mountable at or above a ceiling of the room;
    a mirror movable between a first orientation and a second orientation, wherein said mirror when in said second orientation extends below the ceiling of the room to receive images generated by the projector which pass through an opening in the ceiling and reflect the images to a viewing surface in the room;
    a drive assembly including a motor, said drive assembly operable to move said mirror between said first and second orientations;
    a limit switch circuited with said motor and actuatable by said drive assembly to stop said motor when said mirror moves from said first orientation to said second orientation;
    a stop member abuttable by said drive assembly to positively stop said mirror at said second orientation when said mirror moves from said first orientation to said second orientation; and
    wherein said limit switch and said stop member are provided on a common mounting member adjustably movable relative to said drive assembly, whereby movement of said common mounting member relative to said drive assembly moves both said limit switch and said stop member to adjust said second orientation of said second mirror.

11. The overhead projector mount system of claim 10 further comprising a fixed mirror above the ceiling, said fixed mirror aligned to directly receive images projected by the projector and reflect the images such that the images pass through the opening in the ceiling to be received by said movable mirror.

12. The overhead projector mount system of claim 11 further comprising a bracket support, wherein said mounting member comprises a bracket, wherein one of said bracket support and said bracket comprises at least one slot, wherein the other of said bracket support and said bracket comprises at least one tightenable fastener slidable when not tightened along said at least one slot, wherein said at least one fastener when tightened secures said bracket to said bracket support to prevent relative movement.

13. The overhead projector mount system of claim 12 wherein said stop member comprises a transversely extending flange of said bracket.

14. The overhead projector mount system of claim 13 wherein a portion of said limit switch projects through an opening in said bracket flange.

15. The overhead projector mount system of claim 12 wherein said bracket support comprises an upstanding plate fixedly attached to said projector support.

16. The overhead projector mount system of claim 11 further comprising a second limit switch and a second stop member, wherein said second limit switch is actuated by said drive assembly to stop said motor when said movable mirror moves from said second orientation to said first orientation, wherein said second stop member is abutted by said drive assembly to positively stop said movable mirror at said first orientation when said movable mirror moves from said second orientation to said first orientation, and wherein said second limit switch and said second stop member are provided on a common bracket slidably connected to a bracket support attached to said projector support, whereby sliding movement of said common bracket relative to said bracket support moves both said second limit switch and said second stop member to adjust said first orientation of said movable mirror.

17. The overhead projector mount system of claim 11 wherein said drive assembly comprises an actuating arm rotatable with an output shaft of said motor and structured and arranged to actuate said limit switch and abut said stop member when said movable mirror moves from said first orientation to said second orientation.

18. The overhead projector mount system of claim 17 wherein said limit switch and said actuating arm are cooperatively structured such that said limit switch is actuated by said actuating arm to shut off said motor prior to said actuating arm abutting said stop member during movement of said movable mirror from said first orientation to said second orientation.

19. A housing for an overhead projector comprising:

a base for supporting the projector, said base disposed at or above a ceiling of a room and comprising an opening for passage of projected images into the room;

a cover for said base, said cover comprising first and second pieces;

wherein said first piece is slidable relative to said second piece and said base between closed and opened positions, wherein movement of said first piece from said closed position to said opened position creates an opening in said cover for accessing the projector.

20. The housing of claim 19 wherein said cover comprises a top and first and second opposite sides, and wherein said first piece comprises a portion of each of said top and said first side and said second side of said cover.

21. The housing of claim 19 wherein said first piece is telescopically received under said second piece when moved from said closed position to said opened position.

22. The housing of claim 19 wherein said base further comprises means for supporting a ceiling around said opening in said base.

* * * * *